US007177618B2

(12) United States Patent
Motoyama

(10) Patent No.: US 7,177,618 B2
(45) Date of Patent: Feb. 13, 2007

(54) LOW NOISE BLOCK DOWN CONVERTER WITH A PLURALITY OF LOCAL OSCILLATORS

(75) Inventor: Koji Motoyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 184 days.

(21) Appl. No.: 10/642,494

(22) Filed: Aug. 18, 2003

(65) Prior Publication Data

US 2004/0072550 A1 Apr. 15, 2004

(30) Foreign Application Priority Data

Oct. 9, 2002 (JP) ............................ 2002-296157

(51) Int. Cl.
*H04B 1/10* (2006.01)

(52) U.S. Cl. .................... 455/323; 455/318; 455/3.01; 455/315; 331/68; 725/68

(58) Field of Classification Search ................ 455/313, 455/315–316, 318–319, 333–334, 323, 25, 455/67.12, 63, 3.01–3.02; 331/2, 46, 68, 331/107; 725/68–70, 72; 343/840–841, 343/700 MS See application file for complete search history.

(56) References Cited

U.S. PATENT DOCUMENTS 4,691,378 A 9/1987 Kumamoto et al.
4,922,211 A * 5/1990 Otremba et al. .............. 331/68
5,008,956 A * 4/1991 Hemmie ..................... 455/318
5,046,135 A * 9/1991 Hatcher ...................... 455/303
5,125,109 A * 6/1992 Geller et al. ................ 455/313
5,483,663 A * 1/1996 Tawil .......................... 725/68
5,584,064 A * 12/1996 Nakamura .................. 455/293
5,801,590 A * 9/1998 Kashima et al. .............. 331/68
5,940,750 A * 8/1999 Wang ......................... 455/318
5,995,818 A * 11/1999 Smith ......................... 455/302
6,208,834 B1 * 3/2001 Tawil et al. .............. 455/3.02
6,271,603 B1 8/2001 Kajita
6,344,832 B1 * 2/2002 Lotfy ......................... 343/840
6,538,533 B1 * 3/2003 Hwang et al. .............. 333/202
6,950,644 B2 * 9/2005 Nishina ...................... 455/318
6,967,619 B2 * 11/2005 Khoo et al. .......... 343/700 MS
6,975,837 B1 * 12/2005 Santoru ..................... 455/12.1
2003/0194985 A1 * 10/2003 Nakamura .................. 455/323
2003/0218574 A1 * 11/2003 Suga .......................... 343/840

FOREIGN PATENT DOCUMENTS

EP 0 718 964 A2 6/1996
JP 1-152800 A 6/1989
JP 04-151906 5/1992
JP 05-022028 1/1993

(Continued)

*Primary Examiner*—Erika A. Gary
*Assistant Examiner*—Kamran Afshar
(74) *Attorney, Agent, or Firm*—Birch, Stewart, Kolasch & Birch, LLP

(57) ABSTRACT

A low noise block down converter accommodates two local oscillators within one shielding chamber in a metal shielding box and has a conductive bar provided between two dielectric resonators included in the local oscillators respectively. The conductive bar prevents electromagnetic coupling between the two dielectric resonators. Therefore, the device dimension can be made small compared to the conventional case in which two local oscillators are completely separated from each other by a metal wall.

4 Claims, 7 Drawing Sheets

FOREIGN PATENT DOCUMENTS

| | | | |
|---|---|---|---|
| JP | 05-053331 | | 7/1993 |
| JP | 05-191112 | | 7/1993 |
| JP | 10-098310 | | 4/1998 |
| JP | 10-98311 | A | 4/1998 |
| JP | 2002-246924 | A | 8/2002 |
| JP | 2002-246925 | | 8/2002 |

* cited by examiner

LOW NOISE BLOCK DOWN CONVERTER WITH A PLURALITY OF LOCAL OSCILLATORS

CROSS-REFERENCE TO RELATED APPLICATION

The present application claims priority under 35 U.S.C. §119 to Japanese Patent Application No. 2002-296157, filed Oct. 9, 2002, the entire disclosure of which is hereby incorporated by reference.

BACKGROUND OF THE INVENTION

1. Field of the Invention

The present invention generally relates to a low noise block down converter. More particularly, the present invention relates to a low noise block down converter utilized for a satellite reception system.

2. Description of the Background Art

In a conventional Low Noise Block down converter (hereinafter referred to as an "LNB") with a plurality of local oscillators, each local oscillator is completely separated from another local oscillator by a metal wall in order to prevent electromagnetic coupling between a dielectric resonator in each local oscillator and a dielectric resonator in another local oscillator.

FIGS. 7A and 7B are cross-sectional views showing a main portion of the conventional LNB. FIG. 7A is a cross-sectional view cut along a line VIIA—VIIA in FIG. 7B, while FIG. 7B is a cross-sectional view cut along a line VIIB—VIIB in FIG. 7A.

In FIGS. 7A and 7B, two local oscillators 41*a* and 41*b* of the LNB are respectively housed within shielding chambers 40*a* and 40*b* in a metal shielding box 40, and are electromagnetically shielded by a metal wall 40*c*. Local oscillator 41*a* includes a dielectric resonator 42*a*, an oscillation device 43*a*, a microstrip line 44*a*, and a substrate 45*a*. Local oscillator 41*a* outputs a signal of a certain frequency (e.g. 9.75 GHz). Local oscillator 41*b* includes a dielectric resonator 42*b*, an oscillation device 43*b*, a microstrip line 44*b*, and a substrate 45*b*. Local oscillator 41*b* outputs a signal of another frequency (e.g. 10.6 GHz). In FIG. 7B, dashed circles show electromagnetic fields radiated from dielectric resonators 42*a* and 42*b*.

As described above, in the conventional low noise block down converter, metal shielding box 40 is divided by metal wall 40*c* to prevent electromagnetic coupling between dielectric resonators 42*a* and 42*b*. Therefore, downsizing of metal shielding box 40 and hence the low noise block down converter has been difficult to achieve.

SUMMARY OF THE INVENTION

An object of the present invention is to provide a compact low noise block down converter.

A low noise block down converter according to the present invention includes a plurality of local oscillators each including a dielectric resonator and having an oscillation frequency different from each other, an electromagnetic coupling preventing member preventing electromagnetic coupling between one of the dielectric resonators and another one of the dielectric resonators, and a metal shielding box including one shielding chamber accommodating the plurality of local oscillators and the electromagnetic coupling preventing member. Therefore, the metal shielding box and hence the low noise block down converter can be made small compared to the conventional case in which the plurality of local oscillators are completely separated from each other by a metal wall.

Preferably, the electromagnetic coupling preventing member includes a conductive bar having one end extending between any two of the dielectric resonators and receiving a reference potential. In this case, the conductive bar can prevent the electromagnetic coupling between the two dielectric resonators.

Preferably, the low noise block down converter includes a substrate having a surface on which the plurality of local oscillators are mounted. The electromagnetic coupling preventing member includes a conductive pattern formed on the surface of the substrate between any two of the dielectric resonators and receiving a reference potential. In this case, the conductive pattern can prevent the electromagnetic coupling between the two dielectric resonators.

Preferably, the electromagnetic coupling preventing member further includes a metal plate provided between any two of the dielectric resonators and receiving a reference potential. In this case, the metal plate can prevent the electromagnetic coupling between the two dielectric resonators.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
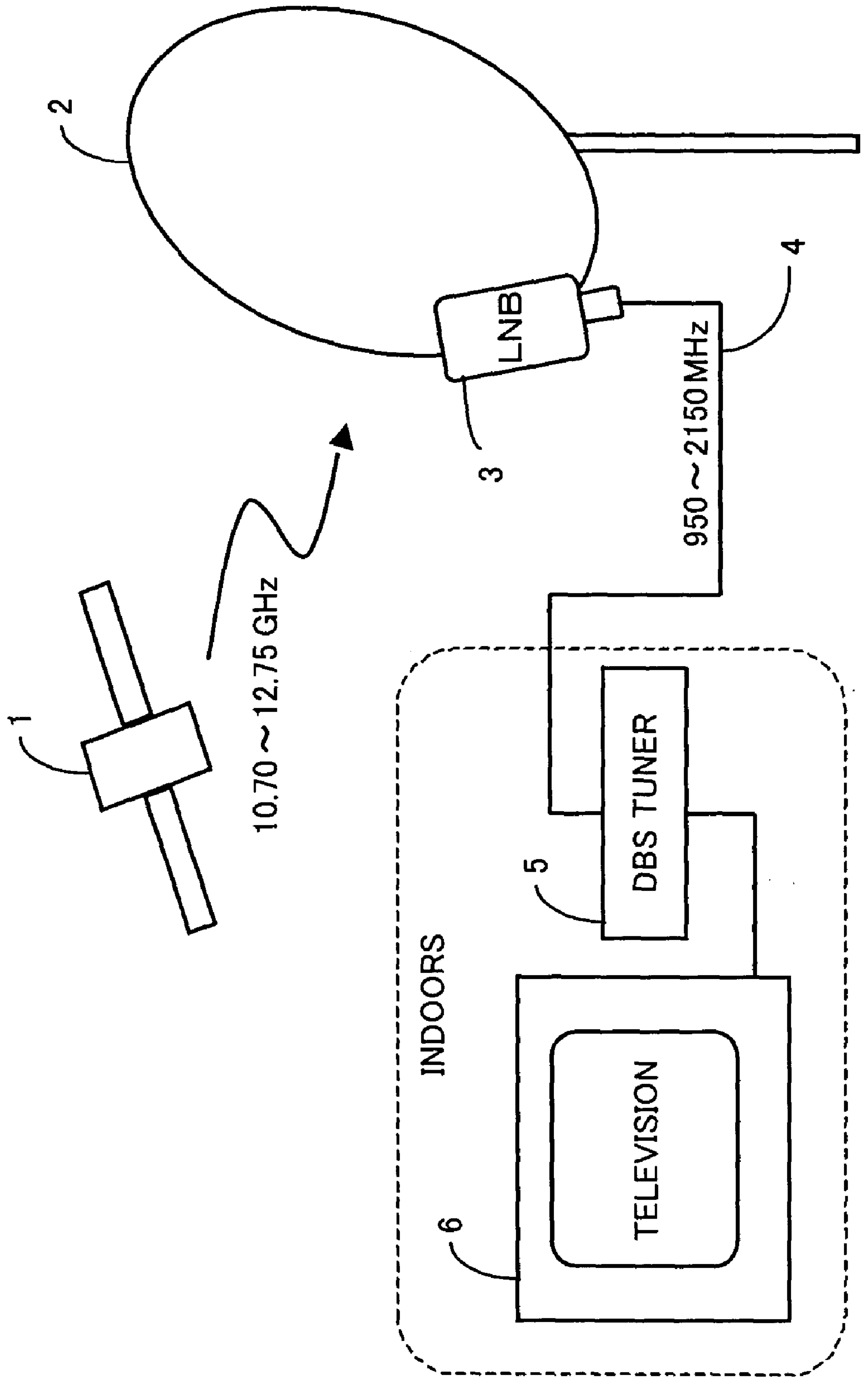
FIG. 1 is a block diagram showing the overall configuration of a satellite reception system in accordance with an embodiment of the present invention.

In FIG. 1, a satellite reception system in accordance with an embodiment of the present invention includes a broadcasting satellite 1, an antenna 2, an LNB 3, an IF (Intermediate Frequency) cable 4, a DBS Direct Broadcasting Satellite) tuner 5, and a television 6.

The operation of the satellite reception system shown in FIG. 1 will now be described. A radio wave in a 12 GHz band (10.70–12.75 GHz) transmitted from broadcasting satellite 1 is received by antenna 2. The received radio wave is frequency-converted to an IF signal in a 1 GHz band (950–2150 MHz) and low-noise amplified by LNB 3 mounted to antenna 2. The IF signal output from LNB 3 is introduced indoors via IF cable 4, demodulated into a video and audio signal by DBS tuner 5, and then transmitted to television 6.

Figure 2:
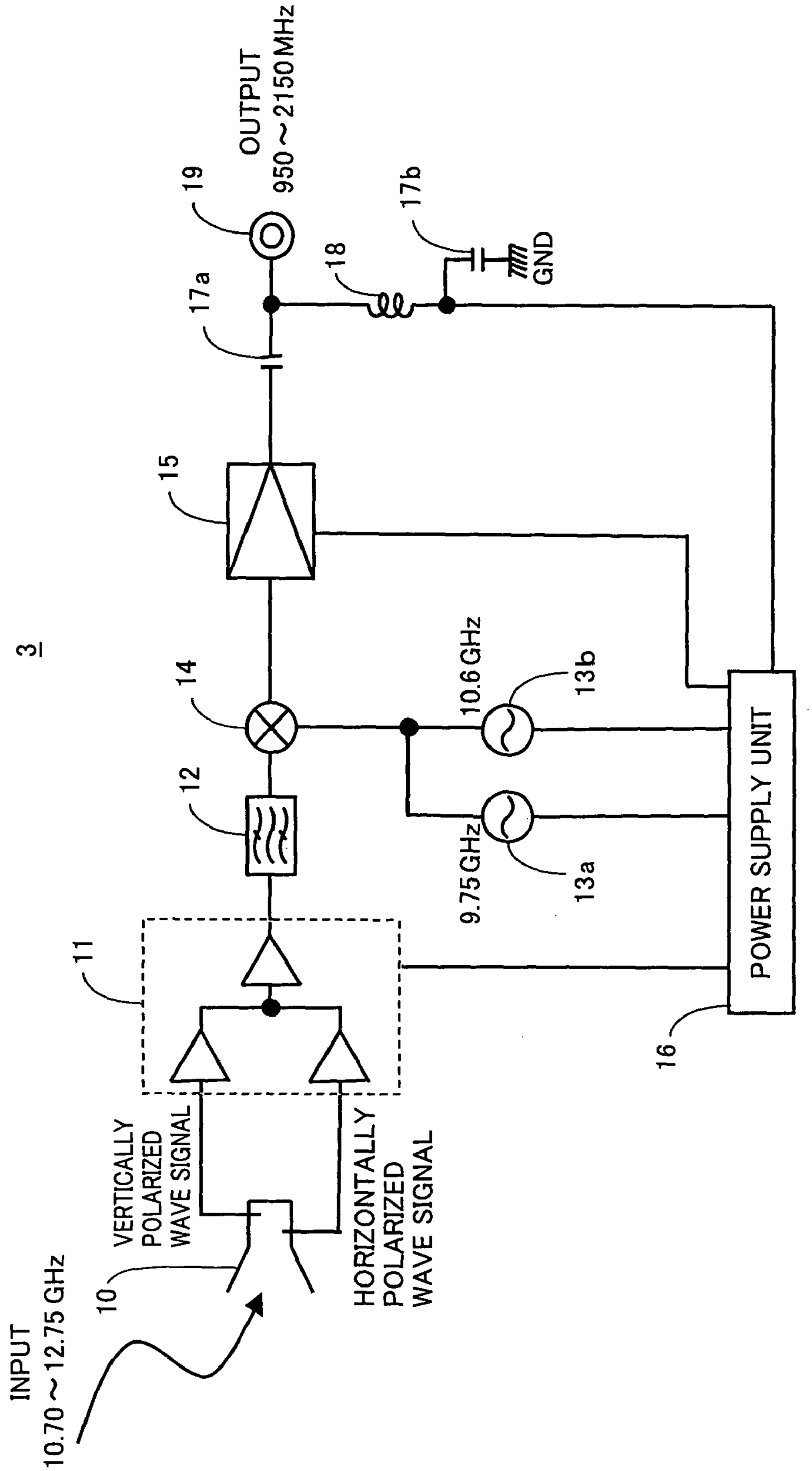
FIG. 2 is a circuit block diagram showing the configuration of a universal LNB 3 shown in FIG. 1.

In FIG. 2, universal LNB 3 includes a waveguide 10, a Low Noise Amplifier (hereinafter referred to as an "LNA") 11, a Band Pass Filter (hereinafter referred to as a "BPF") 12, local oscillators 13*a* and 13*b*, a mixer 14, an IF amplifier 15, a power supply unit 16, condensers 17*a* and 17*b*, a coil 18, and an output terminal 19.

The operation of universal LNB 3 shown in FIG. 2 will now be described. A vertically polarized wave signal and a horizontally polarized wave signal in the 12 GHz band (10.70–12.75 GHz) transmitted from broadcasting satellite 1 are respectively received at two antenna probes in waveguide 10. The received signals are low-noise amplified by LNA 11, and then input to BPF 12. In BPF 12, a signal in an image frequency band is removed to produce a signal in a desired frequency band. The signal output from BPF 12 is mixed with a local oscillation signal (9.75 GHz) from local oscillator 13*a* or with a local oscillation signal (10.6 GHz) from local oscillator 13*b* by mixer 14, and is frequency-converted to the IF signal in the 1 GHz band (950 to 2150 MHz). Two local oscillators 13*a* and 13*b* may be switched therebetween for use. The IF signal output from mixer 14 is amplified to have appropriate noise characteristics and gain characteristics by IF amplifier 15, condensers 17*a* and 17*b*, and coil 18, and is output from output terminal 19. It is noted that LNA 11, local oscillators 13*a* and 13*b*, and IF amplifier 15 are powered through power supply unit 16.

Figure 3A:
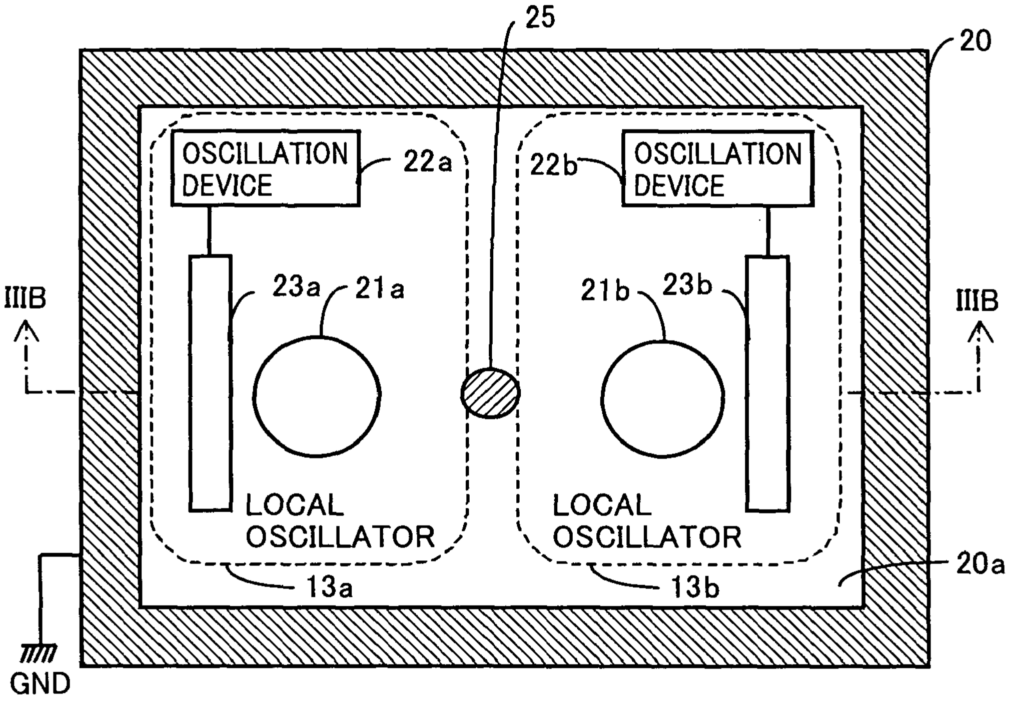
FIGS. 3A and 3B are cross-sectional views showing the configuration of two local oscillators 13*a* and 13*b* shown in FIG. 2.
Figure 3B:
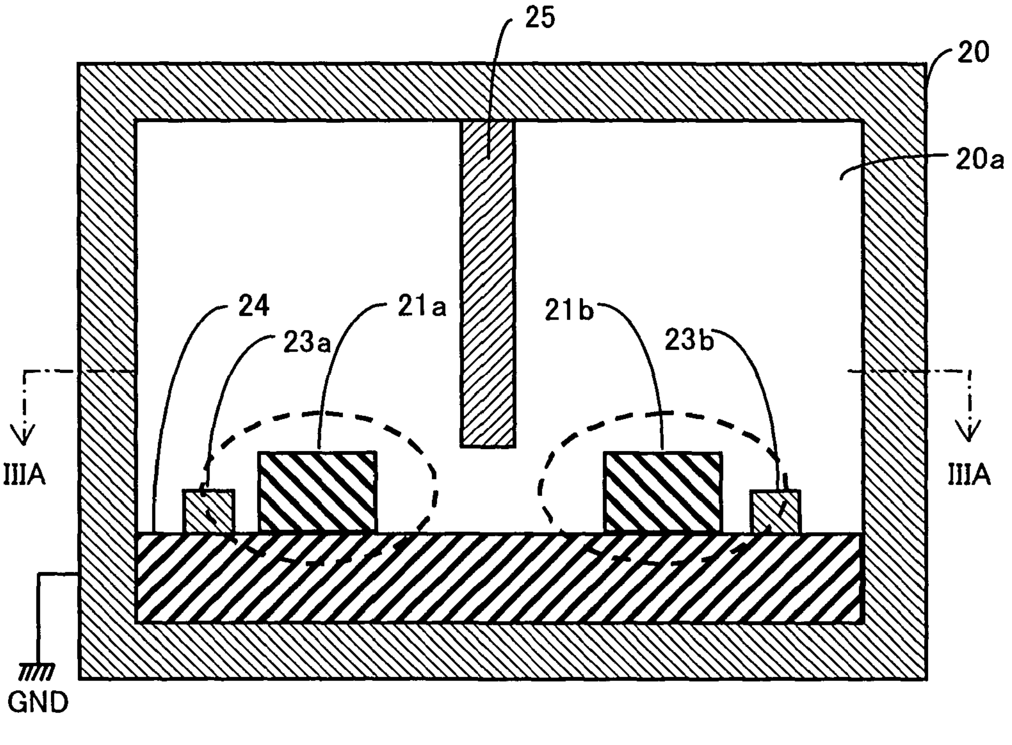

FIGS. 3A and 3B are cross-sectional views showing the configuration of two local oscillators 13*a* and 13*b* shown in FIG. 2. FIG. 3A is a cross-sectional view cut along a line IIIA—IIIA in FIG. 3B, while FIG. 3B is a cross-sectional view cut along a line IIIB—IIIB in FIG. 3A.

In FIGS. 3A and 3B, a substrate 24 with two local oscillators 13*a* and 13*b* mounted thereon and a conductive bar 25 are housed within one shielding chamber 20*a* in a metal shielding box 20. Local oscillator 13*a* includes a dielectric resonator 21*a*, an oscillation device 22*a*, and a microstrip line 23*a*. Local oscillator 13*a* outputs the signal at the frequency of 9.75 GHz. Local oscillator 13*b* includes a dielectric resonator 21*b*, an oscillation device 22*b*, and a microstrip line 23*b*. Local oscillator 13*b* outputs the signal at the frequency of 10.6 GHz. A proximal end of conductive bar 25 is bonded to the middle of a ceiling of metal shielding box 20. A distal end of conductive bar 25 extends between two dielectric resonators 21*a* and 21*b*. Conductive bar 25 and metal shielding box 20 are grounded. Conductive bar 25 prevents coupling of electromagnetic fields (dashed circles in FIG. 3B) radiated from two dielectric resonators 21*a* and 21*b*.

Figure 4A:
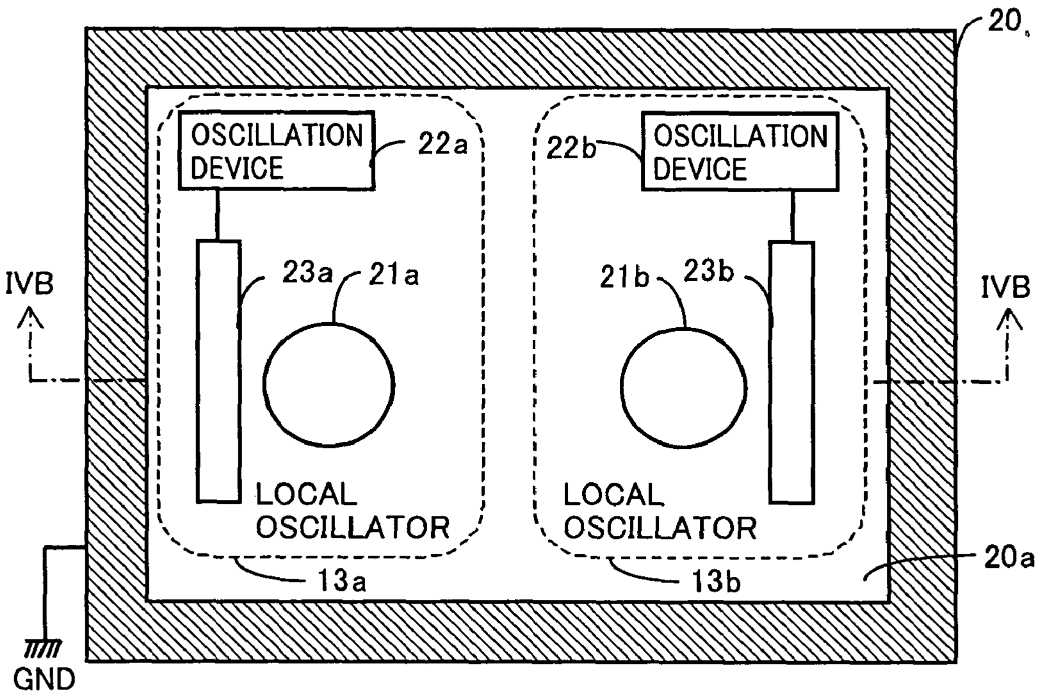
FIGS. 4A and 4B are cross-sectional views showing a comparative example for the present embodiment.
Figure 4B:
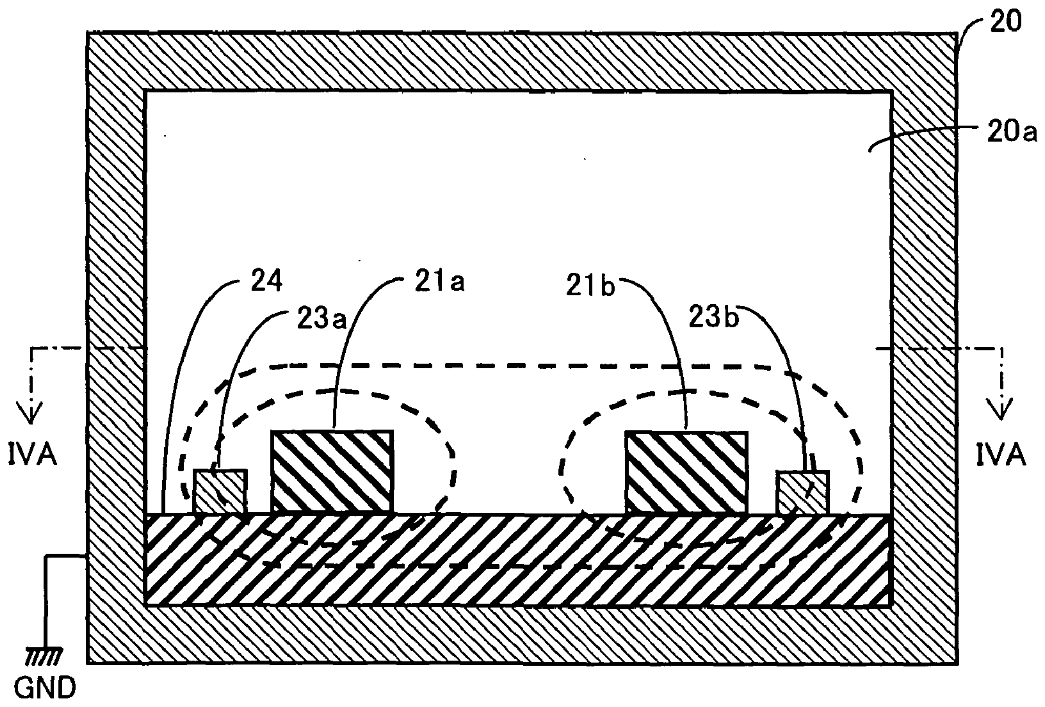

FIGS. 4A and 4B are cross-sectional views showing a comparative example for the present embodiment. FIG. 4A is a cross-sectional view cut along a line IVA—IVA in FIG. 4B, while FIG. 4B is a cross-sectional view cut along a line IVB—IVB in FIG. 4A. The configuration shown in FIGS. 4A and 4B is different from the configuration shown in FIGS. 3A and 3B in that conductive bar 25 is not provided between dielectric resonators 21*a* and 21*b*. In this case, electromagnetic fields (dashed circles in FIG. 4B) radiated from two dielectric resonators 21*a* and 21*b* are coupled to each other. This results in local oscillators 13*a* and 13*b* interfering with each other and failing to produce signals at the desired frequencies (9.75 GHz, 10.6 GHz).

In the present embodiment, the electromagnetic coupling between two dielectric resonators 21*a* and 21*b* is prevented by conductive bar 25. Therefore, metal shielding box 20 and hence the LNB can be smaller compared to the conventional case in which the electromagnetic coupling between two dielectric resonators 21*a* and 21*b* is prevented by metal wall 40*c*. In the present embodiment, two local oscillators 13*a* and 13*b* are provided within one shielding chamber 20*a* in metal shielding box 20. However, it will readily be appreciated that electromagnetic coupling can be prevented even when a plurality of local oscillators are provided in shielding chamber 20*a*, as long as conductive bar 25 is provided for each space between adjacent local oscillators.

Figure 5A:
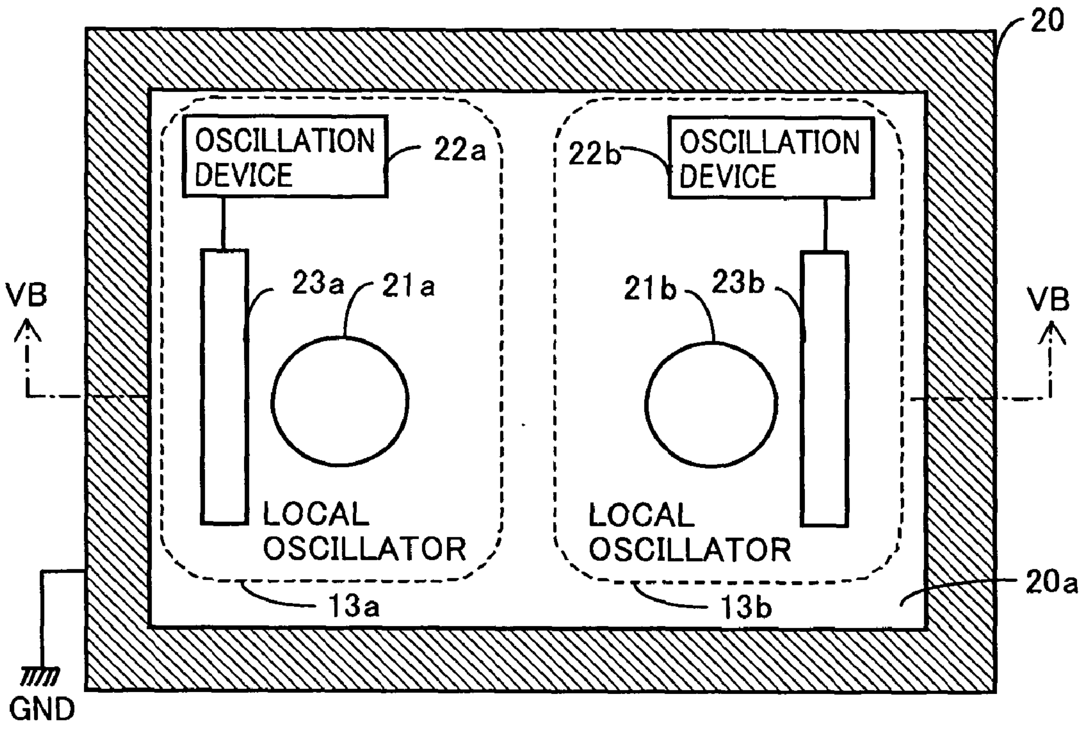
FIGS. 5A and 5B are cross-sectional views showing a modification of the present embodiment.
Figure 5B:
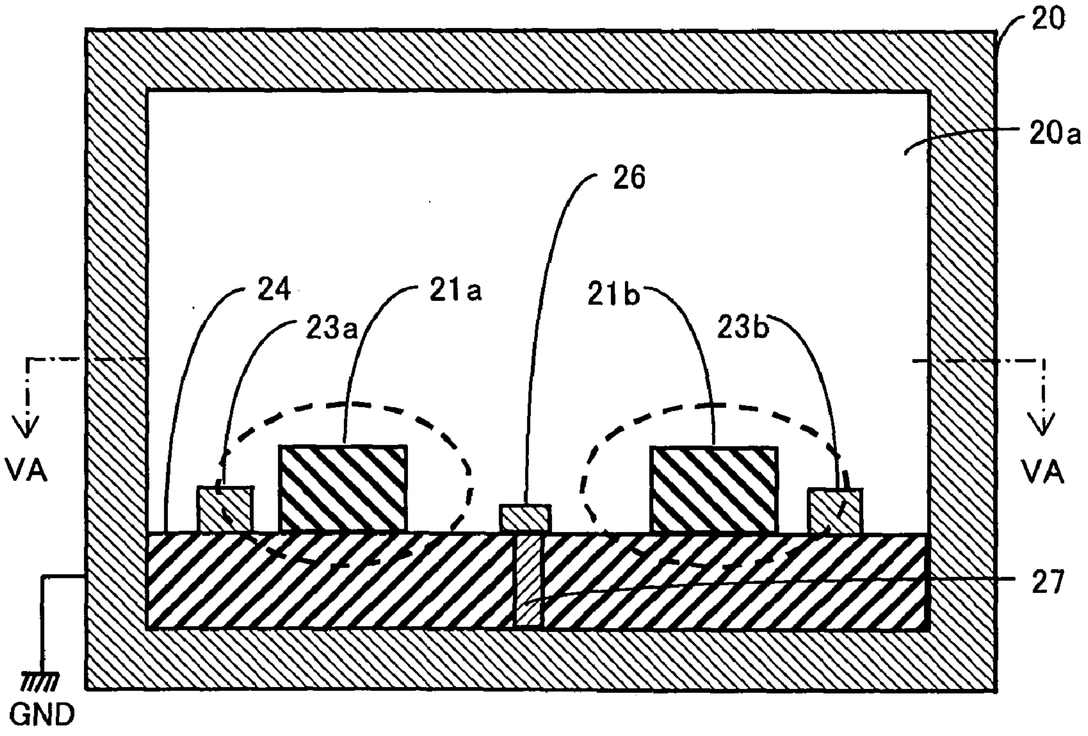

FIGS. 5A and 5B are cross-sectional views showing a modification of the present embodiment. The configuration shown in FIGS. 5A and 5B is different from the configuration shown in FIGS. 4A and 4B in that a ground pattern 26 is formed on substrate 24 between dielectric resonators 21*a* and 21*b* and that ground pattern 26 is connected to metal shielding box 20 via a through hole 27. In this case, ground pattern 26 and through hole 27 prevent coupling between electromagnetic fields (dashed circles in FIG. 5B) radiated from two dielectric resonators 21*a* and 21*b*.

Figure 6A:
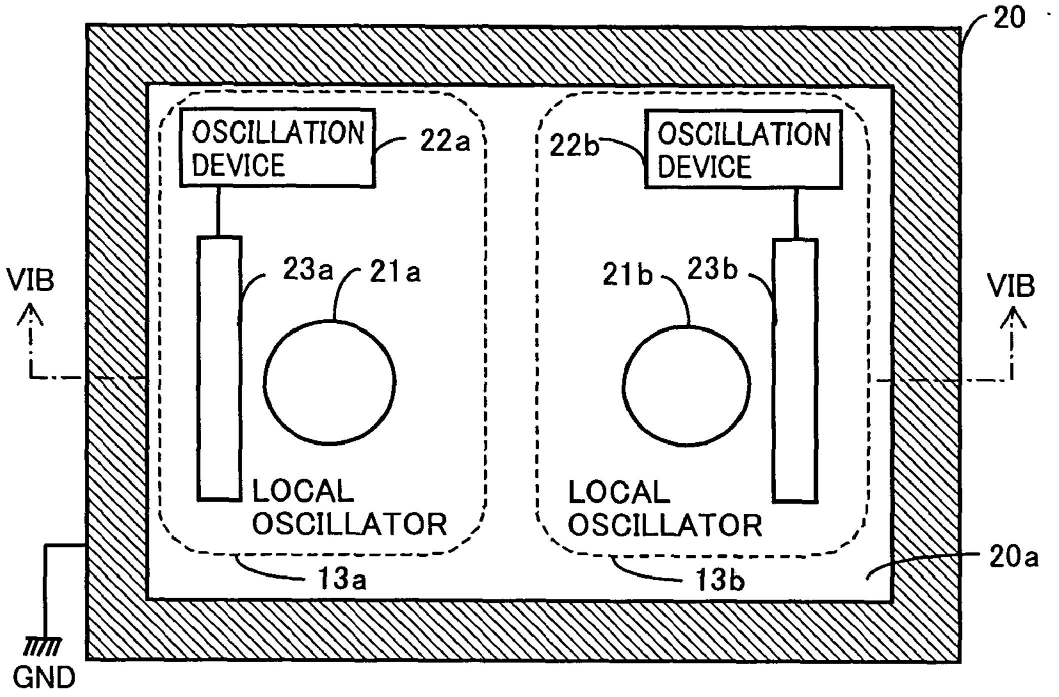
FIGS. 6A and 6B are cross-sectional views showing another modification of the present embodiment.
Figure 6B:
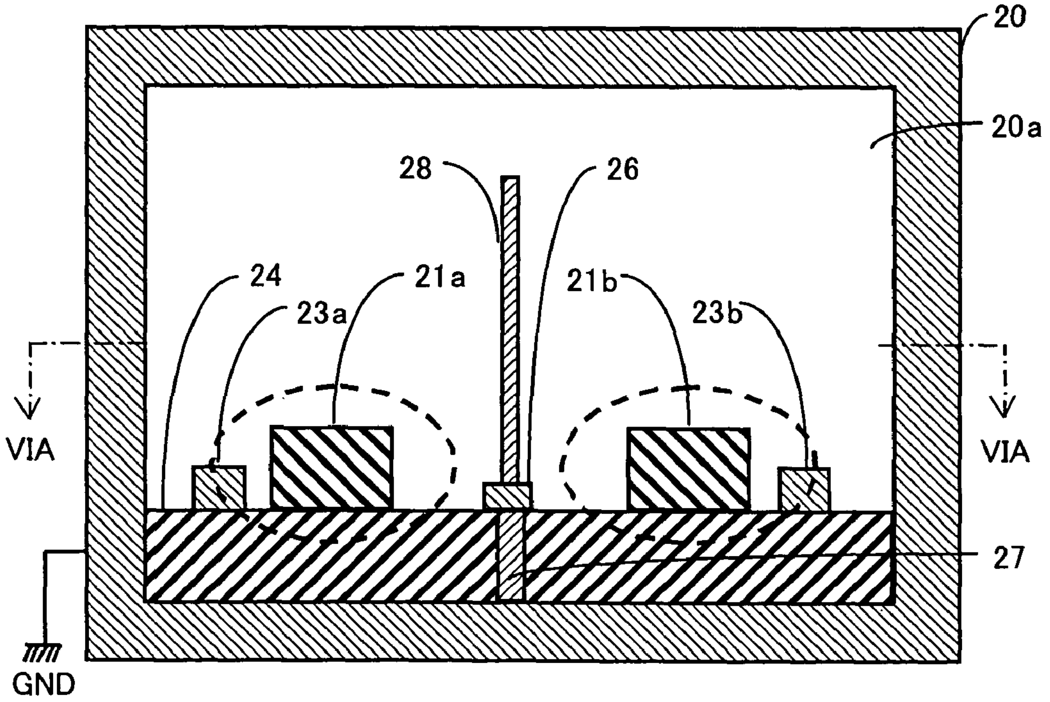
Figure 7A:
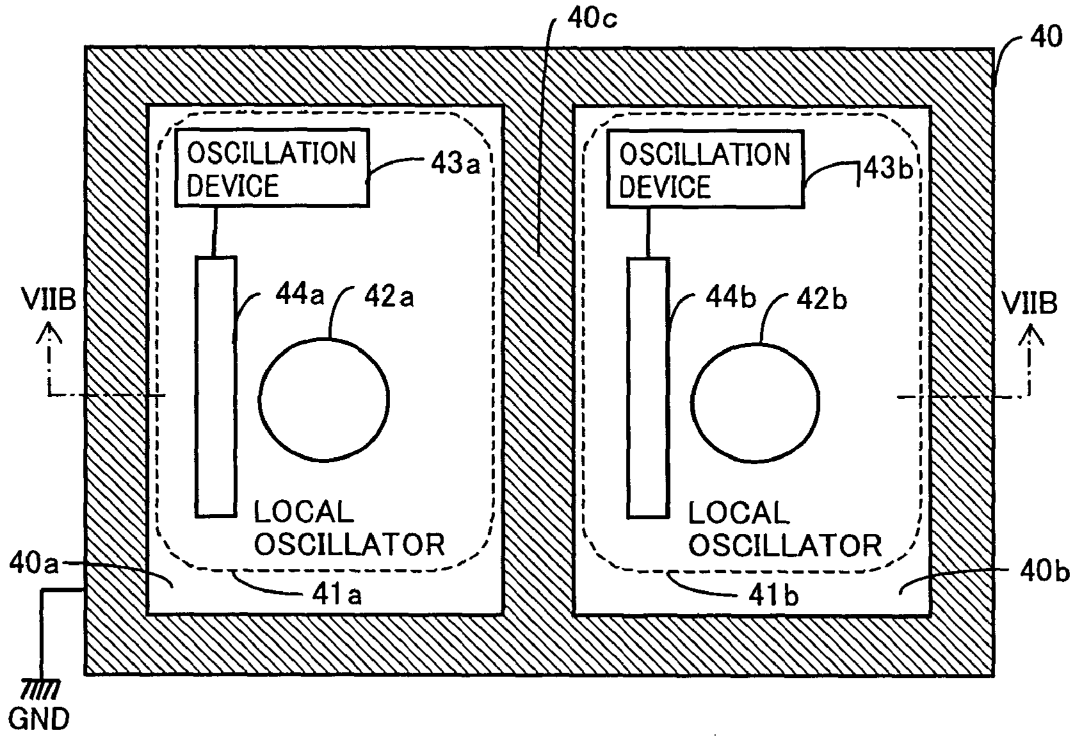
FIG.7A PRIOR ART
FIGS. 7A and 7B are cross-sectional views showing a main portion of the conventional LNB.
Figure 7B:
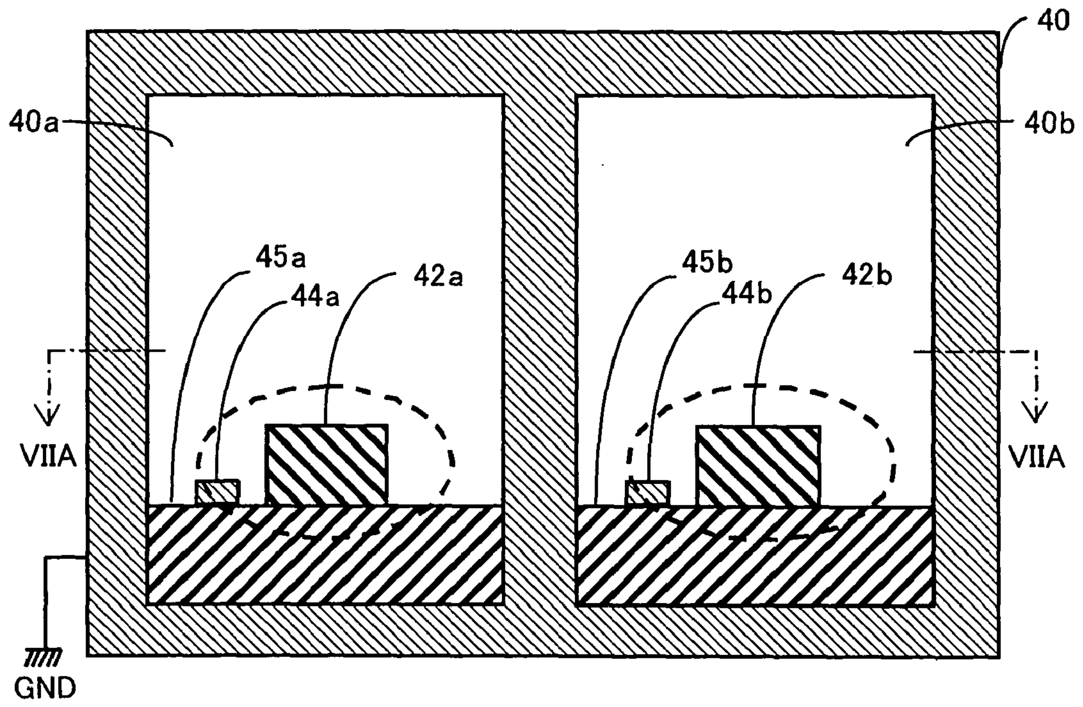
FIG.7B PRIOR ART

FIGS. 6A and 6B are cross-sectional views showing another modification of the present embodiment. The configuration shown in FIGS. 6A and 6B is different from the configuration shown in FIGS. 5A and 5B in that a metal plate 28 is provided on ground pattern 26. In this case, ground pattern 26, through hole 27, and metal plate 28 prevent coupling between electromagnetic fields (dashed circles in FIG. 6B) radiated from two dielectric resonators 21*a* and 21*b*. Therefore, more ensured prevention of the electromagnetic coupling between two dielectric resonators 21*a* and 21*b* can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A low noise block down converter, comprising:

a plurality of local oscillators each including a dielectric resonator and having an oscillation frequency different from each other; and a metal shielding box accommodating said plurality of local oscillators, wherein said metal shielding box includes only one shielding chamber accommodating said plurality of local oscillators and an electromagnetic coupling preventing member preventing electromagnetic coupling between one and another one of said dielectric resonators;

said electromagnetic coupling preventing member extending between any two of said dielectric resonators and receiving a reference potential.

2. The low noise block down converter according to claim 1, wherein said electromagnetic coupling preventing member includes a conductive bar having one end extending between any two of said dielectric resonators and receiving a reference potential.

3. The low noise block down converter according to claim 1, further comprising a substrate having a surface on which said plurality of local oscillators are mounted, wherein said electromagnetic coupling preventing member includes a conductive pattern formed on the surface of said substrate between any two of said dielectric resonators and receiving a reference potential.

4. The low noise block down converter according to claim 1, wherein said electromagnetic coupling preventing member includes a metal plate provided between any two of said dielectric resonators and receiving a reference potential.

* * * * *